(12) United States Patent
Kittichokechai et al.

(10) Patent No.: US 10,681,584 B2
(45) Date of Patent: Jun. 9, 2020

(54) MULTIPLE CQI REPORTING PROCESSES

(71) Applicant: Telefonaktiebolaget LM Ericsson (publ), Stockholm (SE)

(72) Inventors: Kittipong Kittichokechai, Järfälla (SE); Niklas Andgart, Södra Sandby (SE); Jonas Fröberg Olsson, Ljungsbro (SE); Alexey Shapin, Luleå (SE); Efthymios Stathakis, Stockholm (SE); Gustav Wikström, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/223,379

(22) Filed: Dec. 18, 2018

(65) Prior Publication Data
US 2019/0150016 A1 May 16, 2019

Related U.S. Application Data

(63) Continuation of application No. PCT/IB2018/057371, filed on Sep. 24, 2018.
(Continued)

(51) Int. Cl.
*H04W 24/10* (2009.01)
*H04L 1/00* (2006.01)
(Continued)

(52) U.S. Cl.
CPC .......... *H04W 24/10* (2013.01); *H04B 17/336* (2015.01); *H04L 1/0001* (2013.01);
(Continued)

(58) Field of Classification Search
CPC ... H04W 24/10; H04W 84/045; H04B 17/336
See application file for complete search history.

(56) References Cited

U.S. PATENT DOCUMENTS

2010/0135169 A1\* 6/2010 Hu .................. H04L 1/0028
370/252
2014/0003260 A1\* 1/2014 Tabet ................ H04W 72/1231
370/252
(Continued)

FOREIGN PATENT DOCUMENTS

WO 2016174527 A1 11/2016
WO WO-2018064182 A1 \* 4/2018 ............... H04L 1/00

OTHER PUBLICATIONS

International Searching Authority, Notification of Transmittal of the International Search Report and the Written Opinion of the International Searching Authority or the Declaration, Telefonaktiebolaget LM Ericsson (Publ), Int'l Appln. No. PCT/IB2018/057371, dated Jan. 7, 2019, 14 pages.
(Continued)

*Primary Examiner* — Michael Thier
*Assistant Examiner* — Brian P Cox
(74) *Attorney, Agent, or Firm* — Baker Botts, LLP (57) ABSTRACT

According to some embodiments, a method of reporting channel quality information for use in a wireless device of a wireless communication network comprises: measuring a reference signal to determine a signal to noise ratio; determining a first channel quality index (CQI) using the signal to noise ratio and a first transport block error probability (e.g., BLER); determining a second CQI using the signal to noise ratio and a second transport block error probability; and reporting the first CQI and the second CQI to a network node.

22 Claims, 6 Drawing Sheets

Related U.S. Application Data

(60) Provisional application No. 62/566,143, filed on Sep. 29, 2017.

(51) Int. Cl.
*H04B 17/336* (2015.01)
*H04W 84/04* (2009.01)

(52) U.S. Cl.
CPC .......... *H04L 1/0018* (2013.01); *H04L 1/0026* (2013.01); *H04W 84/045* (2013.01)

(56) References Cited

U.S. PATENT DOCUMENTS

| | | | |
|---|---|---|---|
| 2015/0055504 A1* | 2/2015 | Bellamkonda ...... | H04W 40/246 370/254 |
| 2016/0087777 A1 | 3/2016 | Ihm | |
| 2017/0054518 A1* | 2/2017 | Cho .................... | H04B 17/309 |
| 2019/0036584 A1* | 1/2019 | Chang .................. | H04W 24/10 |

OTHER PUBLICATIONS

Intel Corporation, "On link adaptation enhancements to support URLLC," 3GPP TSG RAN WG1 Meeting NR#3, R1-1716326, Nagoyo, Japan, Sep. 18-21, 2017, 5 pages.

Huawei, HiSilicon, "Link adaption and CSI reporting for URLLC transmission," 3GPP TSG RAN WG1 Meeting NR#3, R1-1715414, Nagoyo, Japan, Sep. 18-21, 2017, 10 pages.

ZTE, Sanechips, "Ultra-reliable part of URLLC for scheduling and HARQ procedure," 3GPP TSG RAN WG1 Meeting NR#3, R1-1715529, Nagoyo, Japan, Sep. 18-21, 2017, 5 pages.

* cited by examiner

MULTIPLE CQI REPORTING PROCESSES

PRIORITY

This application is a continuation, under 35 U.S.C. § 120 of International Patent Application. Serial No. PCT/IB2018/057371, filed Sep. 24, 2018, and entitled "MULTIPLE CQI REPORTING PROCESSES" which claims priority to U.S. Provisional Patent Application No. 62/566,143 filed Sep. 29, 2017, both of which are hereby incorporated by reference in their entirety.

TECHNICAL FIELD

Particular embodiments are directed to wireless communications and, more particularly, to principles of operation with multiple channel quality indicator (CQI) reporting processes or with multi-level CQI.

INTRODUCTION

Because of the varying nature of a wireless communication channel, data transmission between a gNB and a user equipment (UE) adapts the modulation scheme and code rate to suit different channel conditions. For downlink communication, the UE can report to the gNB the channel quality in the form of a channel quality indicator (CQI). A CQI report indicates to the gNB the highest modulation and coding scheme (MCS) that the UE predicts to be able to decode with a predefined success probability. That is, the gNB can use information in the CQI report to set MCS properly for different channel conditions.

In LTE, a CQI report corresponds to 10% block error ratio (BLER) target. Because of interference variations and feedback delay, an eNB typically applies an outer loop link adaptation (LA), which uses a CQI offset based on HARQ-ACK feedback.

The CQI report in current LTE systems only corresponds to 10% BLER target. It is not suitable, however, for services or use cases requiring lower BLER, such as ultra-reliable low-latency communication (URLLC). This is because decoding performance is typically UE-specific, meaning that the slope, of a BLER curve versus signal to interference plus noise ratio (SINR) may be different for different UEs. Therefore, it may be impossible to convert CQI corresponding to 10% BLER to CQI corresponding to another target BLER (e.g., 0.1%) at gNB. The CQI offset alone is not sufficient or accurate enough.

One solution may be to use multi-level BLER targets for CQI reporting and transmit one CQI value (e.g., from 1-15) to encode multi-level BLER targets. This solution may be suitable for LTE, where only one CQI reporting process can exist. But reporting accuracy for one BLER target can be partly lost because of sharing of limited CQI values between few target BLER CQIs.

Also, the nominal code rate in LTE or NR needs to be extended because, for certain services, even the lowest rate is not sufficient to support a low BLER requirement.

SUMMARY

The embodiments described herein include methods for reporting a channel quality indicator (CQI) to support services with different block error ratio (BLER) requirements. Particular embodiments include reporting multiple CQI values and a scaling factor. The solution covers operations for both a user equipment (UE) and a gNB as summarized below. Particular embodiments report multiple CQI values and a scaling factor to support services with low BLER targets. Particular embodiments use the CQI report and the scaling factor to set the MCS and TBS appropriately.

Particular embodiments include: (a) configuration of CQI processes; (b) reporting multiple CQI values; (c) configuration of scaling factor for adjusting the code rate reported in CQI; (d) selecting a scaling factor, (e) computing the effective CQI from multiple CQI values; and (f) adjusting the MCS based on the effective CQI and scaling factor information.

For example, the UE and gNb may both include configuration of multiple CQI reporting processes with different characteristics and/or parameters. In particular embodiments at the UE, the CQI report includes one or multiple CQI values and a scaling factor, which can belong to one or multiple CQI processes. The CQI values of different CQI processes or multi-level CQI of one process correspond to different preconfigured BLER targets (e.g., 10% and 0.1%). The scaling factor information describes the factor used to scale the rate of the reported CQI. In particular embodiments at the gNB, given the desired BLER target and multiple BLER target CQIs, the modulation and coding scheme (MCS) is selected as a function of available CQI values and a scaling factor.

According to some embodiments, a method of reporting channel quality information for use in a wireless device of a wireless communication network comprises: measuring a reference signal to determine a signal to noise ratio; determining a first CQI using the signal to noise ratio and a first transport block error probability (e.g., BLER); determining a second CQI using the signal to noise ratio and a second transport block error probability; and reporting the first CQI and the second CQI to a network node.

In particular embodiments, the method further comprises receiving a measurement configuration. The measurement configuration comprises configuration for at least two measurement processes. The measurement configuration may further comprise a first transport block error probability and a second transport block error probability (e.g., BLER).

In particular embodiments, reporting the first CQI and the second CQI to a network node comprises reporting a single reporting message that includes the first CQI and the second CQI. In some embodiments, reporting the first CQI and the second CQI to a network node comprises reporting the first CQI in a first reporting message and the second CQI in a second reporting message.

In particular embodiments, the second CQI is determined based on the first CQI and a scaling factor. In some embodiments, determining the second CQI comprises determining a scaling factor, and wherein reporting the first CQI and the second CQI comprises reporting the first CQI and the scaling factor. The scaling factor may be chosen based on whether the first CQI is below a threshold. The scaling factor may be chosen based on a transport block error probability associated with a service provided by the wireless device.

According to some embodiments, a wireless device of a wireless communication network comprises processing circuitry operable to: measure a reference signal to determine a signal to noise ratio; determine a first CQI using the signal to noise ratio and a first transport block error probability (e.g., BLER); determine a second CQI using the signal to noise ratio and a second transport block error probability (e.g., BLER); and report the first CQI and the second CQI to a network node.

In particular embodiments, the processing circuitry is further operable to receive a measurement configuration.

The measurement configuration comprises configuration for at least two measurement processes. The measurement configuration may further comprise a first transport block error probability and a second transport block error probability.

In particular embodiments, the processing circuitry is operable to report the first CQI and the second CQI to a network node by reporting a single reporting message that includes the first CQI and the second CQI. In some embodiments, the processing circuitry is operable to report the first CQI and the second CQI to a network node by reporting the first CQI in a first reporting message and the second CQI in a second reporting message.

In particular embodiments, the processing circuitry is operable to determine the second CQI based on the first CQI and a sealing factor. In some embodiments, the processing circuitry is operable to determine the second CQI comprises by determining a scaling factor, and the processing circuitry is operable to report the first CQI and the second CQI by reporting the first CQI and the scaling factor. The processing circuitry may be operable to choose the scaling factor based on whether the first CQI is below a threshold. The processing circuitry may be operable to choose the scaling factor based on a transport block error probability associated with a service provided by the wireless device.

According to some embodiments, a method of receiving channel quality information for use in a network node of a wireless communication network comprises sending a measurement configuration to a wireless device. The measurement configuration comprises configuration information for at least two measurement processes. The method further comprises transmitting a reference signal and receiving a measurement report from the wireless device that includes a first CQI associated with the reference signal and a first transport block error probability and a second CQI associated with the reference signal and a second transport block error probability.

In particular embodiments, the measurement configuration information includes the first transport block error probability (e.g., BIER) and the second transport block error probability (e.g., BLER). The measurement configuration information may include the first transport block error probability and a scaling factor.

In particular embodiments, receiving the measurement report comprises receiving a measurement report message that includes the first CQI and the second CQI. In some embodiments, receiving the measurement report comprises receiving a first measurement report message that includes the first CQI and a second measurement report message that includes the second CQI.

In particular embodiments, the method further comprises determining a third CQI associated with a third transport block error probability using the first CQI and the second CQI.

According to some embodiments, a network node of a wireless communication network comprises processing circuitry operable to send a measurement configuration to a wireless device. The measurement configuration comprises configuration information for at least two measurement processes. The processing circuitry is further operable to transmit a reference signal and receive a measurement report from the wireless device that includes a first CQI associated with the reference signal and a first transport block error probability and a second CQI associated with the reference signal and a second transport block error probability.

In particular embodiments, the measurement configuration information includes the first transport block error probability and the second transport block error probability.

The measurement configuration information may include the first transport block error probability and a scaling factor.

In particular embodiments, the processing circuitry is operable to receive the measurement report by receiving a measurement report message that includes the first CQI and the second CQI. In some embodiments, the processing circuitry is operable to receive the measurement report by receiving a first measurement report message that includes the first CQI and a second measurement report message that includes the second CQI.

In particular embodiments, the processing circuitry is further operable to determine a third CQI associated with a third transport block error probability using the first CQI and the second CQI.

According to some embodiments, a wireless device of a wireless communication network comprises a determining module, a transmitting module and a receiving module. The receiving module is operable to measure a reference signal to determine a signal to noise ratio. The determining module is operable to determine a first CQI using the signal to noise ratio and a first transport block error probability and determine a second CQI using the signal to noise ratio and a second transport block error probability. The transmitting module is operable to report the first CQI and the second CQI to a network node.

According to some embodiments, a network node of a wireless communication network comprises a transmitting module and a receiving module. The transmitting module is operable to send a measurement configuration to a wireless device. The measurement configuration comprises configuration information for at least two measurement processes. The transmitting module is further operable to transmit a reference signal. The receiving module is operable to receive a measurement report from the wireless device that includes a first CQI associated with the reference signal and a first transport block error probability and a second CQI associated with the reference signal and a second transport block error probability.

Also disclosed is a computer program product. The computer program product comprises instructions stored on non-transient computer-readable media which, when executed by a processor, perform the steps of: measuring a reference signal to determine a signal to noise ratio; determining a first. CQI using the signal to noise ratio and a first transport block error probability (e.g., BLER); determining a second CQI using the signal to noise ratio and a second transport block error probability; and reporting the first CQI and the second CQI to a network node.

Another computer program product comprises instructions stored on non-transient computer-readable media which, when executed by a processor, perform the step of sending a measurement configuration to a wireless device. The measurement configuration comprises configuration information for at least two measurement processes. The instructions further perform the steps of transmitting a reference signal and receiving a measurement report from the wireless device that includes a first CQI associated with the reference signal and a first transport block error probability and a second CQI associated with the reference signal and a second transport block error probability.

Particular embodiments may include some, all, or none of the following advantages. For example, particular embodiments may enable a gNB to set the MCS more appropriately for low BLER targets and extends the range of supported code rates beyond the default values for robust transmissions.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

The channel quality indicator (CQI) report in current long term evolution (LTE) systems only corresponds to 10% BLER target. It is not suitable, however, for services or use cases requiring lower block error ratio (BLER), such as ultra-reliable low-latency communication (URLLC). This is because decoding performance is typically user equipment (UE)-specific, meaning that the slope of a BLER curve versus signal to interference plus noise ratio (SINR) may be different for different UEs. Therefore, it may be impossible for a gNB to convert CQI corresponding to 10% BLER to CQI corresponding to another target BLER (e.g., 0.1%). The CQI offset alone is not sufficient or accurate enough.

Particular embodiments obviate the problem described above and include methods for reporting CQI to support services with different BLER requirements. Particular embodiments include reporting multiple CQI values and a scaling factor. Particular embodiments may be implemented at a UE and others at a gNB. Particular embodiments may enable a gNB to set the modulation and coding scheme (MCS) more appropriately for low BLER targets and extends the range of supported code rates beyond the default values for robust transmissions.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-6B of the drawings, like numerals being used for like and corresponding parts of the various drawings. LTE and fifth generation (5G) new radio (NR) are used throughout this disclosure as an example cellular system, but the ideas presented herein may apply to other wireless communication systems as well.

Figure 1:
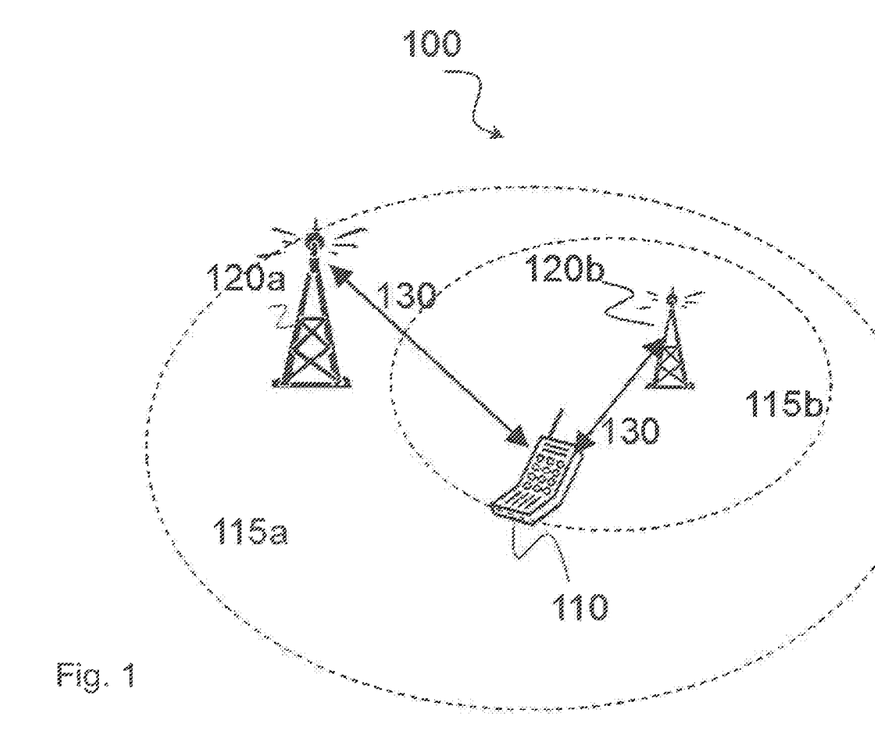
FIG. 1 is a block diagram illustrating an example wireless network, according to a particular embodiment.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations, eNodeBs, gNBs, etc.). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Wireless signal 130 may comprise one or more beams. Particular beams may be beamformed in a particular direction. Each wireless device 110 may have a single receiver or multiple receivers for receiving signals 130 from network nodes 120 or other wireless devices 110. Wireless device 110 may receive one or more beams comprising wireless signal 130.

Wireless signals 130 may be transmitted on time-frequency resources. The time-frequency resources may be partitioned into radio frames, subframes, slots, and/or mini-slots. Network node 120 may dynamically schedule subframes/slots/mini-slots as uplink, downlink, or a combination uplink and downlink. Different wireless signals 130 may comprise different transmission processing times.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, wireless signals 130 may include reference signals. Wireless device 110 may measure the reference signals to determine a channel quality. Wireless device 110 may report the received channel quality to network node 120. Network node 120 may adapt a modulation and coding scheme for transmitting wireless signals 130 to wireless device 110 based on the received channel quality report.

In particular embodiments, wireless device 110 may report more than one CQI to support services with different BLER requirements. Network node 120 may configure wireless device 110 with the number of CQI processes and associated BLER values (e.g., 10% and 0.1%). An advantage is that network node 120 may set the MCS more appropriately for low BLER targets and extends the range of supported code rates beyond the default values for robust transmissions. Further details are described below and with respect to FIGS. 2-4.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 5A below. Similarly, a network node may include any suitable combination of hardware and/or software. For example, in particular embodiments, a network node, such as network node 120, may include the components described with respect to FIG. 6A below.

Particular embodiments include a UE reporting multiple CQI levels. For example, a network may configure a UE for multiple CQI reporting processes with different target BLER levels. The configuration can be done semi-statically over radio resource control (RRC). The multiple processes may have different target BLERS, as well as other parameters, such as reporting periodicity, assumed transmission modes, or antenna usage, etc. The UE supporting multiple CQI processes may have multiple sets of SNR-to-CQI mappings for different BLER targets (see example in Table 1). The assumption is reasonable for a UE supporting different services targeting very low BLER, such as ultra-reliable low-latency communications (URLLC) and normal BLER such as mobile broadband (MBB). The mappings may also be available for different transmission modes and are UE-dependent.

In particular embodiments, if a UE is configured with two or more CQI reporting processes, the UE transmits multiple CQI values. In one example, for two-level CQI report corresponding to BLER targets of X % and Y % where Y % is the lower value, the UE has two sets of SNR-to-CQI mappings for X % and Y % for each transmission mode. To report the two-level CQI, the UE measures SNR (e.g., based on CSI-RS) and uses the table look-up method to find corresponding CQI indices CQI(X %) and CQI(Y %) (see, for example, Table 1).

Several methods are available to report CQI(X %) and CQI(Y %) to the gNB. In one example, the UE transmits two reports at different times or in different messages by using a CQI process identifier. In another example, the UE reports both values at the same time in the same message explicitly, or one "reference" CQI value and a "differential" CQI specifying the difference between another value and the reference.

In some embodiments, the CQI reports can also target a probability of successful reception at different points in time. As defined in the LTE standard, for example, the CQI reports should reflect the BLER for the subframe where the measurement is taken. An alternative approach is to let the report target a time instant in the future, such as after a time equal to the roundtrip time of the CQI feedback loop. In this way, a UE that measures a channel having properties that increase the risk of failed reception would report a decreased CQI. Examples of such channel properties can be, for example, a high Doppler spread, making the current estimate outdated sooner, or a frequency-flat channel, where the receiver cannot rely on frequency diversity to help the decoding succeed.

To further explain the second example above, in some embodiments, the multiple CQI report includes a base CQI value and differential CQI values. The base level CQI may be CQI(10%)=4 and the differential CQI may be CQI (0.1%)−CQI(10%), where for CQI(0.1%)=2 the differential CQI equals −2. In some such embodiments there is an assumed nominal difference between CQI(10%) and CQI (0.1) where the differential CQI indicate deviance from the nominal different. For example, assume the nominal difference is $\Delta=-3$, then differential CQI may indicate CQI (0.1%)−CQI(10%)−$\Delta$=4−2−(−3)=1. The nominal difference may be fixed by standard (e.g., depending BLER difference) or configured using RRC. The nominal difference may also depend on the value of the base CQI, where for example $\Delta=-1$ is used for CQI(10%) in range [1,5], $\Delta=-2$ is used for CQI(10%) in range [6,10], and $\Delta=-3$ is used for CQI(10%) in range [11,15].

Figure 2:
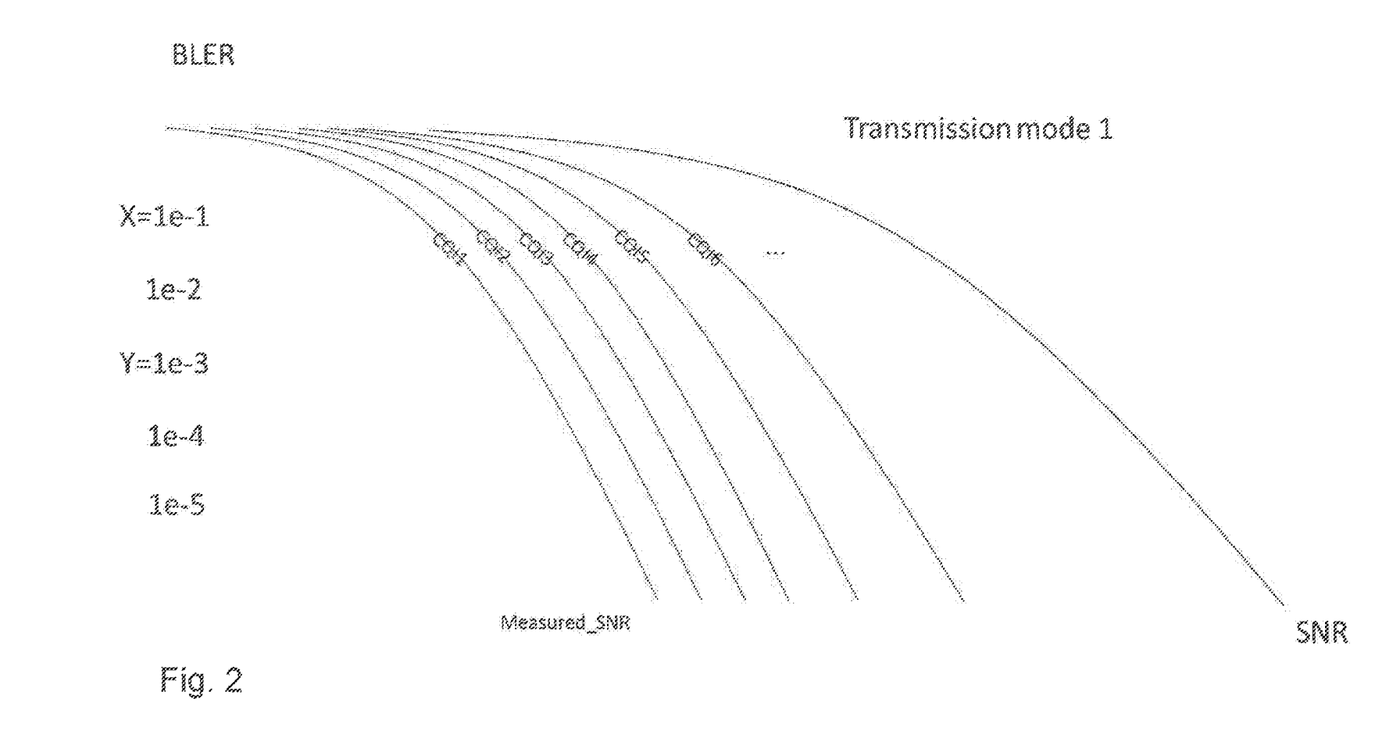
FIG. 2 is a graph illustrating example BLER and SINR performance for various MCS values.

FIG. 2 is a graph illustrating example BLER and SINR performance for various MCS values. The illustrated example is for transmission mode 1. The CQI markers on the curves are for illustration purpose capturing the process of CQI calculation at the UE.

TABLE 1

Example of SNR-CQI mapping at UE for a certain transmission mode, e.g., TX mode 1

| CQI index | SNR (dB) | |
|---|---|---|
| | BLER 10% (X) | BLER 0.1% (Y) |
| 0 | — | — |
| 1 | 2 | 5 |
| 2 | 4 | 7 |
| 3 | 6 | 9 |
| 4 | 8 | 11 |
| 5 | 11 | 15 |
| 6 | 14 | 18 |
| 7 | 18 | 23 |
| ... | ... | ... |
| max | 30 | 40 |

The following example (reused in subsequent sections) is based on FIG. 2 and Table 1. As an example, if the measured SNR=8 dB, the UE can send the CQI report that includes CQI(10%)=CQI4 and CQI(0.1%)=CQI2 in one or multiple (2 here) CQI processes.

Particular embodiments include a scaling factor to support services with low BLER target. One or a set of scaling factors is configured by RRC signaling semi-statically. Two methods of scaling can be considered, namely, configured scaling and indicated scaling.

For configured scaling, the scaling factors are configured for certain BLER targets as configured for CQI processes. The UE applies scaling for a certain BLER target as configured for CQI process. That is, a scaling factor for one CQI reporting process is applied to the code rates of CQI indices. For illustration, an example of scaling extension for 4-bit CQI table in LTE is shown in Table 2 below where two scaling factors beta1 and beta2 are configured for two CQI processes corresponding to two different BLER targets.

TABLE 2

Example of the extension of 4-bit CQI table for configured scaling method

| CQI index | modulation | code rate × 1024 | efficiency | code rate × 1024 (beta1 = 1/2) | efficiency | code rate × 1024 (beta2 = 1/4) | efficiency |
|---|---|---|---|---|---|---|---|
| 0 | | | out of range | | | | |
| 1 | QPSK | 78 | 0.1523 | 39 | 0.0761 | 19 | 0.0381 |
| 2 | QPSK | 120 | 0.2344 | 60 | 0.1172 | 30 | 0.0586 |
| 3 | QPSK | 193 | 0.3770 | 96 | 0.1885 | 48 | 0.0943 |
| 4 | QPSK | 308 | 0.6016 | 154 | 0.3008 | 77 | 0.1504 |
| 5 | QPSK | 449 | 0.8770 | 224 | 0.4385 | 112 | 0.2193 |
| 6 | QPSK | 602 | 1.1758 | 301 | 0.5879 | 150 | 0.2939 |
| 7 | 16QAM | 378 | 1.4766 | 189 | 0.7383 | 94 | 0.3691 |
| 8 | 16QAM | 490 | 1.9141 | 245 | 0.9570 | 122 | 0.4785 |
| 9 | 16QAM | 616 | 2.4063 | 308 | 1.2031 | 154 | 0.6016 |
| 10 | 64QAM | 466 | 2.7305 | 233 | 1.3652 | 116 | 0.6826 |
| 11 | 64QAM | 567 | 3.3223 | 283 | 1.6611 | 141 | 0.8306 |
| 12 | 64QAM | 666 | 3.9023 | 333 | 1.9511 | 166 | 0.9756 |
| 13 | 64QAM | 772 | 4.5234 | 386 | 2.2617 | 193 | 1.1308 |
| 14 | 64QAM | 873 | 5.1152 | 436 | 2.5576 | 218 | 1.2788 |
| 15 | 64QAM | 948 | 5.5547 | 474 | 2.7773 | 237 | 1.3887 |

For indicated scaling, a set of multiple scaling factors is configured for the gNB UE. These scaling factors are used to scale/extend the code rate supported in the CQI report. In particular, the code rate corresponding to CQI1 is extended to lower values by the scaling factors. In other words, the scaling factor can be considered as a factor extending the CQI table to support CQI values between CQI0 and CQI1. For illustration, an example of scaling extension for 4-bit CQI table in LTE where the scaling factors 1/2 and 1/4 are configured is shown in Table 3 below.

TABLE 3

Example of the extension of 4-bit CQI table for indicated scaling method

| CQI index | modulation | code rate × 1024 | efficiency | code rate × 1024 (Scaled by 1/2) | efficiency | code rate × 1024 (Scaled by 1/4) | efficiency |
|---|---|---|---|---|---|---|---|
| 0 | | | out of range | | | | |
| 1 | QPSK | 78 | 0.1523 | 39 | 0.0761 | 19 | 0.038 |
| 2 | QPSK | 120 | 0.2344 | N/A | N/A | N/A | N/A |
| 3 | QPSK | 193 | 0.3770 | N/A | N/A | N/A | N/A |
| 4 | QPSK | 308 | 0.6016 | N/A | N/A | N/A | N/A |
| 5 | QPSK | 449 | 0.8770 | N/A | N/A | N/A | N/A |
| 6 | QPSK | 602 | 1.1758 | N/A | N/A | N/A | N/A |
| 7 | 16QAM | 378 | 1.4766 | N/A | N/A | N/A | N/A |
| 8 | 16QAM | 490 | 1.9141 | N/A | N/A | N/A | N/A |
| 9 | 16QAM | 616 | 2.4063 | N/A | N/A | N/A | N/A |
| 10 | 64QAM | 466 | 2.7305 | N/A | N/A | N/A | N/A |
| 11 | 64QAM | 567 | 3.3223 | N/A | N/A | N/A | N/A |
| 12 | 64QAM | 666 | 3.9023 | N/A | N/A | N/A | N/A |
| 13 | 64QAM | 772 | 4.5234 | N/A | N/A | N/A | N/A |
| 14 | 64QAM | 873 | 5.1152 | N/A | N/A | N/A | N/A |
| 15 | 64QAM | 948 | 5.5547 | N/A | N/A | N/A | N/A |

In particular embodiments, indicated scaling includes methods for scaling factor selection. The UE can select a scaling factor based on a certain rule which can be up to a particular UE implementation.

In one embodiment, the selected scaling factor depends on the value of CQI(Y %). For example, if CQI(Y %)<threshold, the scaling factor 1/4 is selected. Otherwise, the scaling factor 1/2 is selected. In this case, 1-bit is used to report the scaling factor.

The threshold generally depends on the value of Y and can be set in different ways according to the UE implementation. In one example, the threshold can be set to a fixed small value. If CQI(Y %) is smaller than the threshold, the UE should report a lower scaling factor so that if the scaling is needed, the extended code rate can be sufficiently low to support the desired BLER. This method of scaling factor selection accounts for different UE implementations through the value CQI(Y %).

As an example, if threshold=CQI3, scaling factor 1/4 is selected. Scaling factor index=1 is reported together with CQI(10%)=CQI4 and CQI(0.1%)=CQI2.

In another embodiment, the scaling factor is selected based on service requirements. For example, the lower scaling factor is used for services with BLER requirement below certain preconfigured level.

Some embodiments include CQI interpolation/extrapolation at a network node, such as the gNB. In particular embodiments, a gNB computes an effective CQI from multiple CQI values in the CQI report. The desired BLER can be different from the multiple BLER levels configured for CQI reporting. Given multiple CQI values, the gNB can interpolate/extrapolate the reported values to the effective CQI value which corresponds to the desired BLER target. Different embodiments may use interpolation, extrapolation, rounding methods, or any other suitable manner of estimation. A first example includes a linear interpolation/extrapolation method. Another example includes a robust CQI selection method where, if the desired BLER is between X and Y where Y<X, then always choose Y. Another example includes CQI offset, where the gNB applies additional offset to the effective CQI.

As a specific example, if the desired BLER=1e−2, the interpolation is applied and gives the effective CQI=CQI3. If the desired BLER=1e−3, the effective CQI=CQI2. If the desired BLER=1e−4, the extrapolation is applied and gives the effective CQI=CQI1. If the desired BLER=1e−5, the extrapolation is applied and gives the effective CQI=CQI0.

Some embodiments include setting MCS using a scaling factor at a gNB. In particular embodiments, the MCS and TBS are selected as a function of the effective CQI and the scaling factor information.

For configured scaling, the scaling factors corresponding to the configured CQI processes are used to set the MCS/TBS. In a particular embodiment, the resulting scaling factor corresponding to the interpolation/extrapolation of multiple CQI values from multiple CQI processes is used. In some embodiments, the scaling factor corresponding to the lower BLER is used.

For indicated scaling, the indicated scaling factor is used to set the MCS/TBS. In a particular embodiment, the indicated scaling is used when the effective CQI after interpolation/extrapolation is lower than CQI1. That is, if the effective CQI lies between CQI1 and CQI max, the effective CQI is used directly to set the MCS. If the effective CQI is equal to CQI0, the scaling factor is used to set the MCS and TBS. That is, the lowest MCS based on CQI1 is selected and the TBS is additionally scaled by the indicated scaling factor to lower the code rate.

As an example, if the effective CQI=CQI0, then indicated scaling is used. The lowest MCS is selected and the TBS is scaled by a scaling factor 1/4 as indicated in part 2). That is, TBS=TBS0*1/4.

Figure 3:
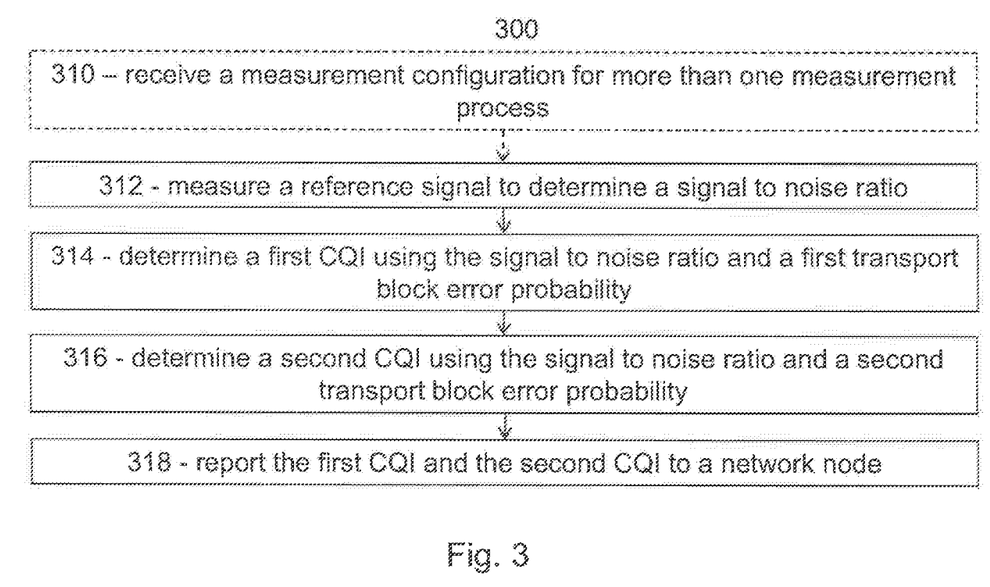
FIG. 3 is a flow diagram illustrating an example method in a wireless device, according to particular embodiments.
Figure 4:
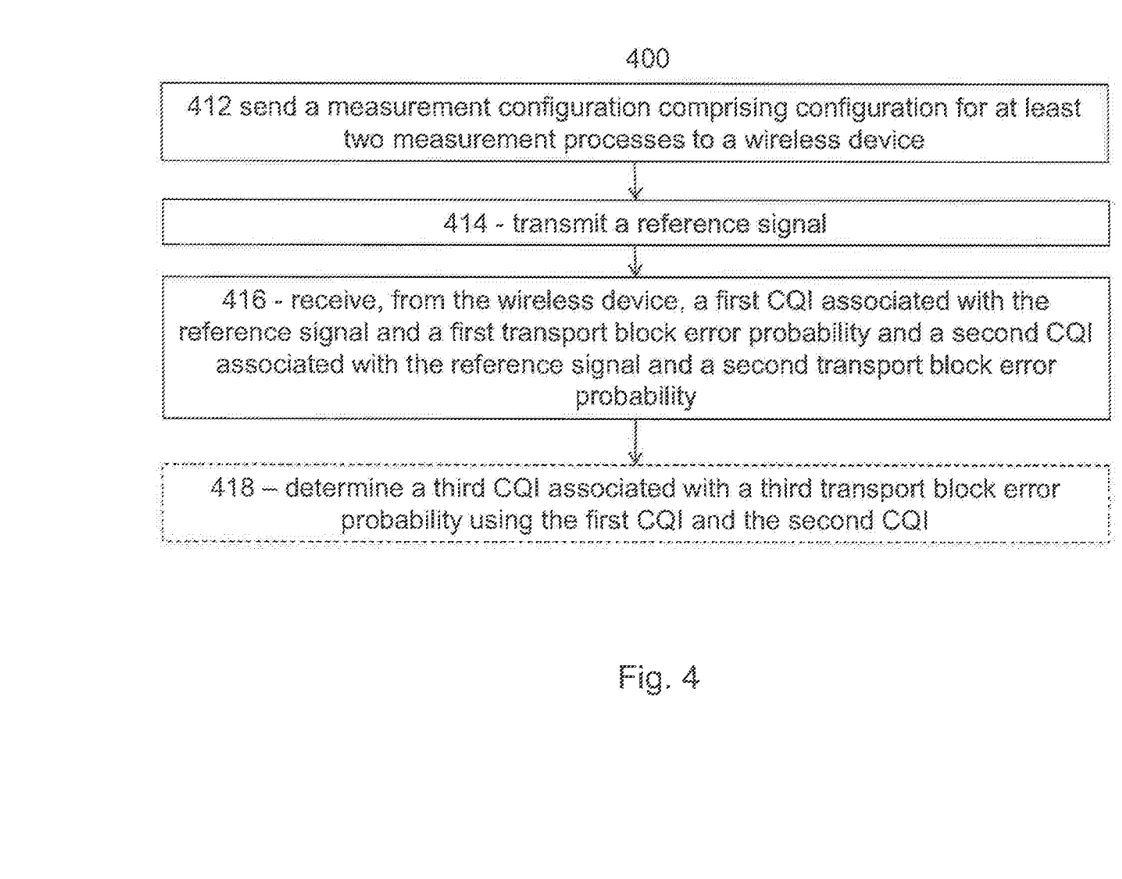
FIG. 4 is a flow diagram illustrating an example method in a network node, according to particular embodiments.

General examples of the embodiments described above are illustrated in FIGS. 3 and 4. FIG. 3 is an example in a wireless device, such as a UE, and FIG. 4 is an example in a network node, such as a gNB.

FIG. 3 is a flow diagram illustrating an example method in a wireless device, according to particular embodiments. In particular embodiments, one or more steps of FIG. 3 may be performed by wireless device 110 of network 100 described with respect to FIG. 1.

The method may begin at step 310, where a wireless device receives a measurement configuration. The measurement configuration comprises configuration for at least two measurement processes. For example, network node 120 may send a measurement configuration to wireless device 110 that includes two transport block error probabilities (e.g., a first BLER of 10% and a second BLER of 0.1%). Although particular BLER values are used as examples, particular embodiments may use and suitable number of transport block error probabilities and any suitable values. The values may depend on the type of services offered (e.g., URLLC, etc.).

At step 312, the wireless device measures a reference signal to determine a signal to noise ratio. For example, wireless device 110 may measure a CSI-RS transmitted from network node 120 to determine a channel quality, such as a signal to noise ratio.

At step 314, the wireless device determines a first channel quality index using the signal to noise ratio and a first target BLER. (e.g., 10%). For example, wireless device 110 may look up a channel quality index in a first table associated with the first target BLER (e.g., 10%), or wireless device 100 may scale a value in a common channel quality index table by a scaling value associated with the first target BLER. In some embodiments, wireless device 110 may determine the first channel quality index according to any of the embodiments and examples described above.

At step 316, the wireless device determines a second channel quality index using the signal to noise ratio and a second target BLER (e.g., 0.1%). For example, wireless device 110 may look up a channel quality index in a table associated with the second target BLER (e.g., 0.1%), wireless device 100 may scale a value in the common channel quality index table by a scaling value associated with the second target BLER, or wireless device 110 may scale the first CQI by a scaling factor.

In some embodiments, the wireless device may not determine a CQI index explicitly. The wireless device may determine a scaling factor that combined with the first CQI represents a determined CQI. In some embodiments, wireless device 110 may determine the second channel quality index according to any of the embodiments and examples described above.

At step 318, the wireless device reports the first channel quality index and the second channel quality index to a network node. For example, wireless device 110 may report the first and second channel quality indices to network node 120. The reporting may be in a single message or multiple messages. The reporting values may be absolute values or relative values. For example, all the values may comprise an explicit CQI, or some values may comprise a scaling factor relative to a particular CQI. In particular embodiments, wireless device 110 reports the first and second channel quality indices according to any of the embodiments and examples described above.

Modifications, additions, or omissions may be made to method 300 of FIG. 3. Additionally, one or more steps in the method of FIG. 3 may be performed in parallel or in any suitable order. The steps may be repeated over time as necessary.

FIG. 4 is a flow diagram illustrating an example method in a network node, according to particular embodiments. In particular embodiments, one or more steps of FIG. 4 may be performed by network node 120 of network 100 described with respect to FIG. 1.

The method begins at step 412, where a network node sends a measurement configuration comprising configuration for at least two measurement processes to a wireless device. For example, network node 120 may send a first target BLER (e.g., 10%) and a second target BLER (e.g., 0.1%) to wireless device 110.

Although particular BLER values are used as examples, particular embodiments may use and suitable values and number of values. The values may depend on the type of services offered (e.g., URLLC, etc.). In particular embodiments, network node 120 may send the measurement configuration according to any of the embodiments and examples described above.

At step 414, the network node transmits a reference signal. For example, network node 120 may transmit a CSI-RS.

At step 416, the network node receives, from the wireless device, a first channel quality index associated with the reference signal and the first transport block error probability (e.g., BLER), and a second channel quality index associated with the reference signal and the second transport block error probability (e.g., BLER). For example, network node 120 may receive the first and second channel quality indices as described with respect to step 318 of FIG. 3, or according to any of the embodiments and examples described above.

At step 418, the network node may use the first channel quality index and the second channel quality index to determine a third channel quality index associated with a third target BLER. For example, network node 120 interpolates or extrapolates using the first and second channel quality indices to determine a third channel quality index associated with a third target BLER. In particular embodiments, network node 120 may interpolate or extrapolate according to any of the embodiments and examples described above.

Modifications, additions, or omissions may be made to method 400 of FIG. 4. Additionally, one or more steps in the method of FIG. 4 may be performed in parallel or in any suitable order. The steps may be repeated over time as necessary.

Figure 5A:
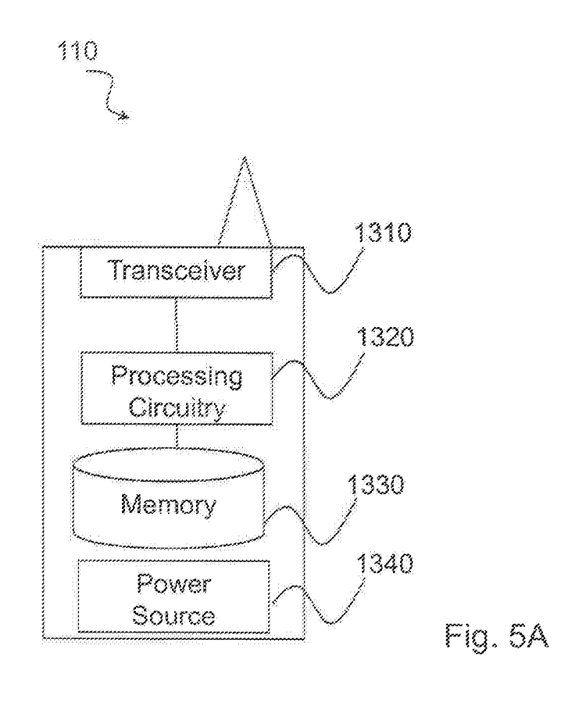
FIG. 5A is a block diagram illustrating an example embodiment of a wireless device.

FIG. 5A is a block diagram illustrating an example embodiment of a wireless device. The wireless device is an example of the wireless devices 110 illustrated in FIG. 1. In particular embodiments, the wireless device is capable of determining and transmitting multiple channel quality index values each associated with a different target BLER.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIGURE SA) responsible for providing certain aspects of the wireless device's functionality, including any of the functionality described above and/or any additional functionality (including any functionality necessary to support the solution described above).

Figure 5B:
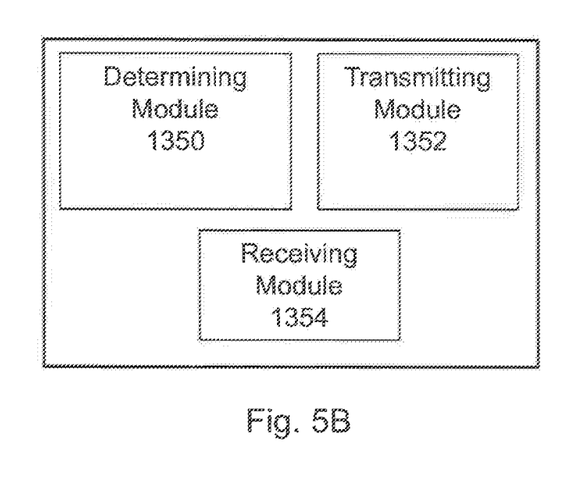
FIG. 5B is a block diagram illustrating example components of a wireless device.

FIG. 5B is a block diagram illustrating example components of a wireless device 110. The components may include determining module 1350, transmitting module 1352 and receiving module 1354.

Determining module 1350 may perform the determining functions of wireless device 110. For example, determining module 1350 measures a reference signal to determine a signal to noise ratio and/or determines channel quality indices for multiple target BLER values according to any of the examples and embodiments described above. In certain embodiments, determining module 1350 may include or be included in processing circuitry 1320. In particular embodiments, determining module 1350 may communicate with transmitting module 1352 and receiving module 1354.

Transmitting module 1352 may perform the transmitting functions of wireless device 110. For example, transmitting module 1352 may report multiple channel quality index values to a network node according to any of the examples and embodiments described above. In certain embodiments, transmitting module 1352 may include or be included in processing circuitry 1320. In particular embodiments, transmitting module 1352 may communicate with determining module 1350 and receiving module 1354.

Receiving module 1354 may perform the receiving functions of wireless device 110. For example, receiving module 1354 may receive a reference signal and/or CQI reporting configuration according to any of the examples and embodiments described above. In certain embodiments, receiving module 1354 may include or be included in processing circuitry 1320. In particular embodiments, transmitting module 1352 may communicate with determining module 1350 and transmitting module 1352.

Figure 6A:
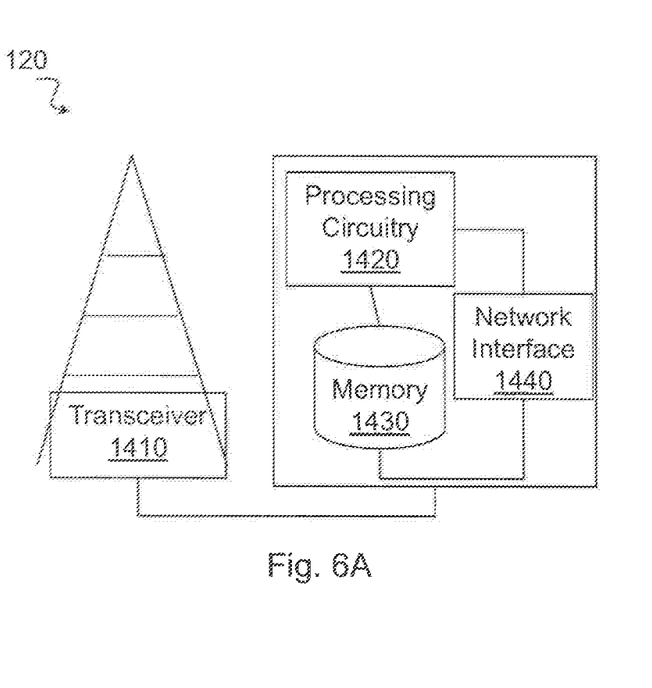
FIG. 6A is a block diagram illustrating an example embodiment of a network node.

FIG. 6A is a block diagram illustrating an example embodiment of a network node. The network node is an example of the network node 120 illustrated in FIG. 1. In particular embodiments, the network node is capable of configuring and/or receiving multiple channel quality reports from a wireless device.

Network node 120 can be an eNodeB, a nodeB, a gNB, a base station, a wireless access point (e.g., a Wi-Fi access point), a low power node, a base transceiver station (BTS), a transmission point or node, a remote RFunit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIGURE 5A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

Figure 6B:
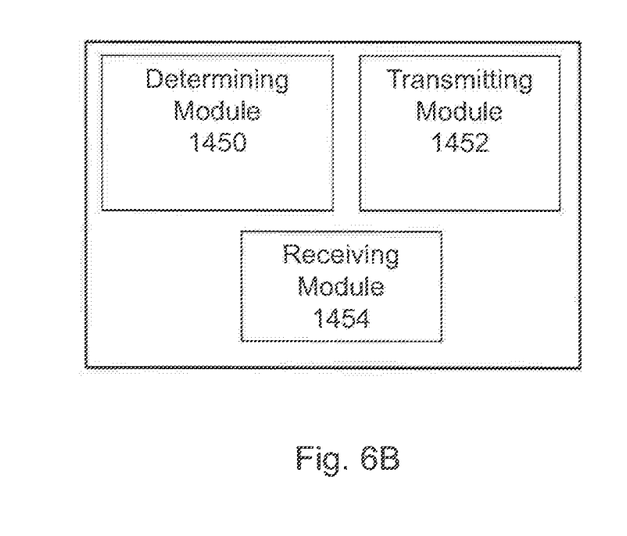
FIG. 6B is a block diagram illustrating example components of a network node.

FIG. 5B is a block diagram illustrating example components of a network node 120. The components may include determining module 1450, transmitting module 1452 and receiving module 1454.

Determining module 1450 may perform the determining functions of network node 120. For example, determining module 1450 may determine an MCS or TBS based on received channel quality information, and/or extrapolate or interpolate channel quality information according to any of the examples and embodiments described above. In certain embodiments, determining module 1450 may include or be included in processing circuitry 1420. In particular embodiments, determining module 1450 may communicate with transmitting module 1452 and receiving module 1454.

Transmitting module 1452 may perform the transmitting functions of network node 120. For example, transmitting module 1452 may transmit channel quality reporting configuration, and/or reference signals according to any of the examples and embodiments described above. In certain embodiments, transmitting module 1452 may include or be included in processing circuitry 1420. In particular embodiments, transmitting module 1452 may communicate with determining module 1450 and receiving module 1454.

Receiving module 1454 may perform the receiving functions of network node 120. For example, receiving module 1454 may receive channel quality reports according to any of the examples and embodiments described above. In certain embodiments, receiving module 1454 may include or be included in processing circuitry 1420. In particular embodiments, transmitting module 1452 may communicate with determining module 1450 and transmitting module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
5G Fifth Generation
BBU Baseband Unit
BLER Block Error Ratio
BTS Base Transceiver Station
CC Component Carrier
CQI Channel Quality Information
CSI Channel State Information
D2D Device to Device
DFT Discrete Fourier Transform
DMRS Demodulation Reference Signal
eNB eNodeB
FDD Frequency Division Duplex
FFT Fast Fourier Transform
gNB Next-generation NodeB
LA Link Adaptation
LAA Licensed-Assisted Access
LBT Listen-before-talk
LTB Long Term Evolution
LTE-U LTE in Unlicensed Spectrum
M2M Machine to Machine
MCS Modulation and Coding Scheme
MIB Master Information Block
MIMO Multi-Input Multi-Output
MTC Machine Type Communication
NR New Radio
OFDM Orthogonal Frequency Division Multiplexing
PRB Physical Resource Block
RAN Radio Access Network
RAT Radio Access Technology
RBS Radio Base Station
RNC Radio Network Controller
RRC Radio Resource Control
RRH Remote Radio Head
RRU Remote Radio Unit
SCell Secondary Cell
SI System Information
SIB System Information Block
SINR Signal to Interference plus Noise Ratio
TB Transport Block
TBS Transport Block Size
TDD Time Division Duplex
TTI Transmission Time Interval
UE User Equipment
UL Uplink
URLLC Ultra Reliable Low Latency Communication
UTRAN Universal Terrestrial Radio Access Network
WAN Wireless Access Network

The invention claimed is:

1. A method of reporting channel quality information for use in a wireless device of a wireless communication network, the method comprising:
  measuring a reference signal to determine a signal to noise ratio;
  determining a first channel quality index (CQI) using the signal to noise ratio and a first transport block error probability;
  determining a second CQI using the signal to noise ratio and a second transport block error probability, wherein the second CQI is determined based on the first CQI and a scaling factor, wherein the scaling factor is chosen based on whether the first CQI is below a threshold; and reporting the first CQI and the second CQI to a network node.

2. The method of claim 1, wherein the first and second transport block error probabilities comprise a target block error ratio (BLER).

3. The method of claim 1, further comprising receiving a measurement configuration, the measurement configuration comprising configuration for at least two measurement processes.

4. The method of claim 3, the measurement configuration further comprising a first transport block error probability and a second transport block error probability.

5. The method of claim 1, wherein reporting the first CQI and the second CQI to a network node comprises reporting a single reporting message that includes the first CQI and the second CQI.

6. The method of claim 1, wherein reporting the first CQI and the second CQI to a network node comprises reporting the first CQI in a first reporting message and the second CQI in a second reporting message.

7. The method of claim 1, wherein reporting the first CQI and the second CQI comprises reporting the first CQI and the scaling factor.

8. The method of claim 1, wherein the scaling factor is chosen based on a transport block error probability associated with a service provided by the wireless device.

9. A wireless device of a wireless communication network, the wireless device comprising processing circuitry operable to:
measure a reference signal to determine a signal to noise ratio;
determine a first channel quality index (CQI) using the signal to noise ratio and a first transport block error probability;
determine a second CQI using the signal to noise ratio and a second transport block error probability, wherein the processing circuitry determines the second CQI based on the first CQI and a scaling factor, wherein the scaling factor is chosen based on whether the first CQI is below a threshold; and
report the first CQI and the second CQI to a network node.

10. The wireless device of claim 9, wherein the first and second transport block error probabilities comprise a target block error ratio (BLER).

11. The wireless device of claim 9, the processing circuitry further operable to receive a measurement configuration, the measurement configuration comprising configuration for at least two measurement processes.

12. The wireless device of claim 11, the measurement configuration further comprising a first transport block error probability and a second transport block error probability.

13. The wireless device of claim 9, wherein the processing circuitry is operable to report the first CQI and the second CQI to a network node by reporting a single reporting message that includes the first CQI and the second CQI.

14. The wireless device of claim 9, wherein the processing circuitry is operable to report the first CQI and the second CQI to a network node by reporting the first CQI in a first reporting message and the second CQI in a second reporting message.

15. The wireless device of claim 9, wherein the processing circuitry is operable to report the first CQI and the second CQI by reporting the first CQI and the scaling factor.

16. The wireless device of claim 9, wherein the processing circuitry is operable to choose the scaling factor based on a transport block error probability associated with a service, provided by the wireless device.

17. A method of receiving channel quality information for use in a network node of a wireless communication network, the method comprising:
sending a measurement configuration to a wireless device, the measurement configuration comprising configuration information for at least two measurement processes;
transmitting a reference signal;
receiving a measurement report from the wireless device that includes a first channel quality index (CQI) associated with the reference signal and a first transport block error probability and a scaling factor associated with the reference signal and a second transport block error probability, wherein the scaling factor is based on whether the first CQI is below a threshold; and
determining a second CQI based on the first CQI and the scaling factor.

18. The method of claim 17, wherein the measurement configuration information includes the first transport block error probability and the second transport block error probability.

19. The method of claim 17, wherein the measurement configuration information includes the first transport block error probability and a scaling factor.

20. The method of claim 17, wherein the first and second transport block error probabilities comprise a target block error ratio (BLER).

21. The method of claim 17, further comprising determining a third CQI associated with a third transport block error probability using the first CQI and the second CQI.

22. A network node of a wireless communication network, the network node comprising processing circuitry operable to:
send a measurement configuration to a wireless device, the measurement configuration comprising configuration information for at least two measurement processes;
transmit a reference signal;
receive a measurement report from the wireless device that includes a first channel quality index (CQI) associated with the reference signal and a first transport block error probability and a scaling factor associated with the reference signal and a second transport block error probability, wherein the scaling factor is based on whether the first CQI is below a threshold; and
determine a second CQI based on the first CQI and the scaling factor.

* * * * *